United States Patent [19]

Nagashima

[11] Patent Number: 4,847,999
[45] Date of Patent: Jul. 18, 1989

[54] CHAIN SAW

[75] Inventor: Akira Nagashima, Kawasaki, Japan

[73] Assignee: Kioritz Corporation, Tokyo, Japan

[21] Appl. No.: 301,859

[22] Filed: Jan. 4, 1989

Related U.S. Application Data

[63] Continuation of Ser. No. 110,048, Oct. 15, 1987, abandoned.

[30] Foreign Application Priority Data

Oct. 23, 1986 [JP] Japan .............................. 61-162835[U]

[51] Int. Cl.$^4$ ............................................. F16N 13/14
[52] U.S. Cl. ...................................... 30/123.4; 30/383
[58] Field of Search ...................... 30/123.4, 381, 383; 83/169; 417/192, 500

[56] References Cited

U.S. PATENT DOCUMENTS

| | | | |
|---|---|---|---|
| 2,741,275 | 4/1956 | Johnsen et al. | 30/123.4 |
| 3,938,622 | 2/1976 | Densow . | |
| 4,094,382 | 6/1978 | Lee | 30/123.4 X |
| 4,353,163 | 10/1982 | Overbury et al. | 30/123.4 |
| 4,678,411 | 7/1987 | Wieland . | |
| 4,683,659 | 8/1987 | Wünsch et al. | 30/383 X |

Primary Examiner—Frank T. Yost
Assistant Examiner—Michael D. Folkerts
Attorney, Agent, or Firm—Browdy and Neimark

[57] ABSTRACT

A chain saw is disclosed in which a cylinder of a plunger type oil pump is made of a tubular member, the cylinder body fitted at one end to a pump body and is closed at the other end by a plug member made of elastic material, and an oil flow path in communication with a chain guide groove of a guide bar of a saw chain is formed in the plug member.

2 Claims, 1 Drawing Sheet

CHAIN SAW

This application is a continuation of application Ser. No. 110,048, filed 10/15/87 now abandoned.

BACKGROUND OF THE INVENTION

1. Field of the Invention

The present invention relates to a chain saw having a plunger type oil pump for supplying lubrication oil to a saw chain and an oil flow path through which oil discharged from the oil pump is supplied to a chain guide groove in a guide bar of the saw chain.

2. Description of the Prior Art

In a prior art chain saw, a cylinder of an oil pump is formed integrally with a body of the oil pump. Due to such a structure, a hole is formed in the pump body from the outside and is precisely worked into an exact cylinder. The cylinder is closed at its outer end by a cover member. Also, the oil flow path is bored in the chain saw body. The oil flow hole is at one end in communication and alignment with an outlet path of the oil pump and is connected at the other end to an oil supply port of the guide bar (through a metal pipe or the like).

Such a structure requires precision working or machining for both the pump body and the chain saw body. This needs a large amount of work and cost for manufacture of the chain saw. Also, elaborate work is needed to avoid possible leakage of oil from the outlet passage of the oil pump, the contacting surface between the oil supply port of the guide bar and the hole of the oil pump body and the like. Therefore, the arrangement and mounting of these components are unduly limited.

SUMMARY OF THE INVENTION

Accordingly, an object of the present invention is to provide a chain saw which may overcome the above-noted drawbacks inherent in the conventional chain saw and which has a simple and functional structure.

A chain saw according to the present invention is characterized in that a cylinder of an oil pump is made of a tubular member, the cylinder is fitted at one end to the pump body and is closed at the other end by a plug member made of elastic material, and an oil flow path is formed in the plug member. It is therefore possible to readily produce or assemble the oil pump and the oil flow path by forming in advance the tubular member for the oil pump cylinder, then inserting the cylinder into the pump body and mounting the plug member of elastic material thereto.

Accordingly, since the cylinder of the oil pump is worked or machined in advance from the tubular member with a high precision, and this worked cylinder is mounted on the pump body from the outside, it is possible to readily manufacture and assemble the oil pump at low cost. Also, it is possible to readily clog or plug the end of the cylinder by a plug member made of elastic material. At the same time, the oil flow path is formed in the plug member, so that the number of components may be reduced, which leads to the decreased dimension and simplification of the structure. Furthermore, it is ensured to prevent the oil leakage.

DESCRIPTION OF THE PREFERRED EMBODIMENT

Figure 1:
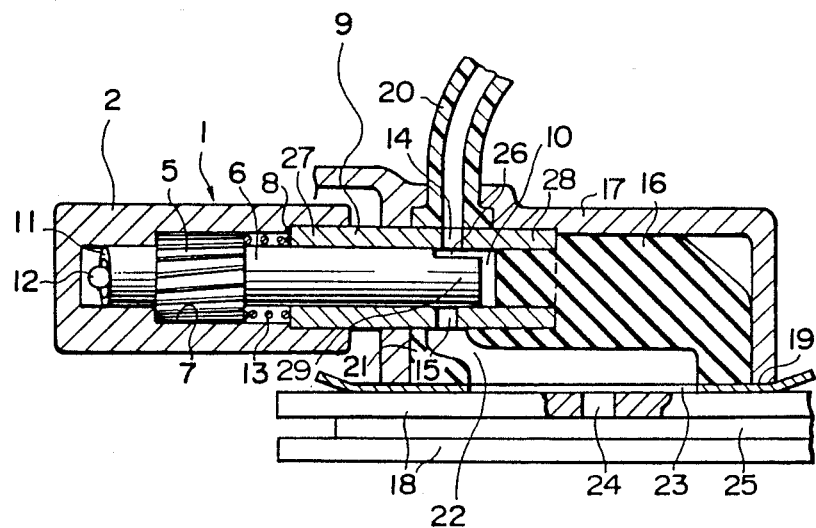
FIG. 1 is a cross-sectional view showing a pump section of a chain saw in accordance with the present invention.
Figure 2:
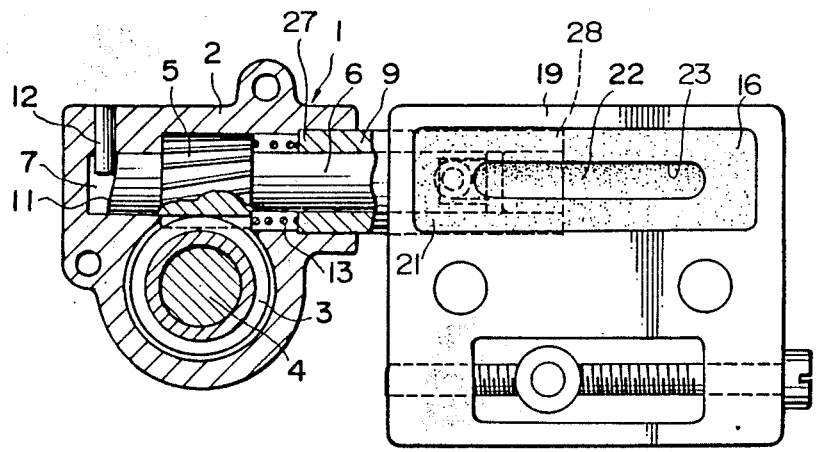
FIG. 2 is another sectional view showing the part shown in FIG. 1.

The present invention will now be described with reference to the accompanying drawings.

According to the embodiment of the present invention, a chain saw has an oil pump 1 for supplying lubrication oil to a saw chain (not shown). The oil pump 1 with its body 2 is fixed to a portion, adjacent to a lubrication oil tank (not shown), of the chain saw body. A worm gear 3 is rotatably disposed within the pump body 2 and is rotatably connected to one end of a drive shaft 4. The other end of the drive shaft 4 is drivingly connected to an output shaft (not shown) of an internal combustion engine mounted on the body of the chain saw.

A plunger 6 having a worm wheel portion 5 which is engaged with the worm gear 3 is rotatably disposed at one end portion within an inner hollow portion 7 of the pump body 2 and is slidable in the axial direction. The inner hollow portion 7 has a larger diameter at its open end at which a step portion 8 is formed. The worm wheel portion 5 is made of synthetic resin or the like and is molded integrally in a coaxial manner with a plunger 6 made of metal material such as a rod steel member that has been machined with a high precision. A cylinder 9 which is composed of a tubular steel member is inserted from the open end of the hollow portion 7 into abutment with the step portion 8 of the inner hollow portion 7. The plunger 6 is rotatably and slidably inserted into the cylinder 9 with its end defining a pump chamber 10 of the oil pump 1. One end of the plunger 6 extends from the worm wheel portion 5 in the axial direction and enters the cylinder 9 to form a pump section of the oil pump 1. The plunger 6 has an end face cam 11 at a pump body side end. On the other hand, a pin 12 which projects into the inner hollow portion 7 is implanted in the pump body 2, and an inner end of the pin 12 is in abutment with the cam 11 of the plunger 6. A compression coil spring 13 is interposed between an inner end portion 27 of the cylinder 9 and the worm wheel portion 5, so that the compression coil spring 13 urges the cam 11 of the plunger 6 against the pin 12.

The cylinder 9 has, at diametrically opposite locations of the circumferential wall thereof, an inlet opening 14 and an outlet opening 15 open to the pump chamber 10. An opening of an outer end 28 of the cylinder 9 is closed by clogging therein a plug member 16 made of elastic material such as rubber in a liquid tight condition. The plug member 16 is held by a frame member 17 provided in the chain saw body for surrounding the plug member 16. The frame member 17 is constructed together with a mount seat surface 19 for a guide bar 18 for guiding a travel of the saw chain (not shown). Furthermore, a flexible tube 20 is provided on a wall surface of the frame member 17 on the cylinder 9 side. The flexible tube 20 is aligned at one end with the inlet opening 14 of the cylinder 9 and is intimately and liquid-tightly clamped between the outer circumferential wall of the cylinder 9 and the wall surface of the frame member 17. The flexible tube 20 is communicated at the other end with the lubrication oil tank of the chain saw body, so that the oil is supplied from the tank to the pump chamber 10 within the cylinder 9. The plug member 16 has an integral extension 21 for liquid-tightly contacting with the outer circumferential portion around the outlet opening 15 of the cylinder 9. In the integral extension 21, an oil flow path 22 is formed and is at one end in alignment with the outlet opening 15. The other end of the oil flow path 22 is formed in the plug member 16 and is laterally opened in an elongated opening 23 toward the mount seat surface 19. The opening 23 open toward the mount seat surface 19 is in communication with an oil supply port 24 formed in the guide bar 18, so that the lubrication oil is supplied to the slidingly travelling saw chain along a chain guide groove 25.

With such a structure in accordance with the embodiment, when the worm gear 3 is rotated by a drive force derived from the internal combustion engine of the chain saw, the worm wheel portion 5 engaged with the worm gear 3 is reciprocatingly moved in the axial direction while rotating together with the plunger 6. This reciprocating movement is carried out within a range determined by the cam 11 and the pin 12. According to the reciprocating movement of the end portion 29 of the plunger 6, a volume of the pump chamber 10 within the cylinder 9 is changed. In the operation, during the intake stroke in which the volume of the pump chamber 10 is increased, the outlet opening 15 is closed by the end portion 29 of the plunger 6 but the inlet opening 14 is communicated with the pump chamber 10 by a cutaway 26 formed in the end portion of the plunger 6, so that the lubrication oil is absorbed into the pump chamber 10 from the oil tank through the flexible tube 20 and the inlet opening 14. Also, during a discharge stroke in which the volume of the pump chamber 10 is decreased, inversely, the inlet opening 14 is closed by the end portion 29 of the plunger 6 that has a different position due to the rotation but the outlet opening 15 is communicated with the pump chamber 10 through the cutaway 26, so that the oil within the pump chamber 10 is discharged through the outlet opening 15, the oil flow path 22, the opening 23 and the oil supply opening 24 to the chain guide groove 25 to thereby lubricate the saw chain.

I claim:

1. A chain saw comprising a plunger type oil pump having a cylinder and a plunger slidably inserted into said cylinder, and an oil flow path means for supplying oil discharged from said oil pump to a chain guide groove of a guide bar of a saw chain, where the cylinder of said oil pump is made of a tubular member, said cylinder being fitted at one end thereof to a pump body and being closed at the other end thereof by a plug member made of elastic material to define a pump chamber together with the plunger and whereby oil is prevented from flowing out either end of said cylinder, and said oil flow path means being formed in said plug member at a point remote from either end of said cylinder.

2. The chain saw according to claim 1, wherein said cylinder comprises an outlet connected to said oil flow path means through which the oil passes.

* * * * *